United States Patent
Morris et al.

(10) Patent No.: US 9,161,105 B2
(45) Date of Patent: Oct. 13, 2015

(54) ROUTING OPTICAL SIGNALS

(75) Inventors: Terrel Morris, Garland, TX (US);
Michael Renne Ty Tan, Menlo Park, CA (US); Shih-Yuan Wang, Palo Alto, CA (US); Michael Steven Schlansker, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/373,457

(22) PCT Filed: Apr. 11, 2012

(86) PCT No.: PCT/US2012/033120
§ 371 (c)(1),
(2), (4) Date: Jul. 21, 2014

(87) PCT Pub. No.: WO2013/154553
PCT Pub. Date: Oct. 17, 2013

(65) Prior Publication Data
US 2014/0369682 A1    Dec. 18, 2014

(51) Int. Cl.
*H04B 10/00* (2013.01)
*H04Q 11/00* (2006.01)

(52) U.S. Cl.
CPC ..... *H04Q 11/0005* (2013.01); *H04Q 2011/003* (2013.01); *H04Q 2011/0032* (2013.01); *H04Q 2011/0039* (2013.01); *H04Q 2011/0058* (2013.01)

(58) Field of Classification Search
CPC .......... H04Q 11/0005; H04Q 2011/0058; H04Q 2011/0032; H04Q 2011/0039; H04Q 2011/003

USPC ...................................................... 398/55–57
See application file for complete search history.

(56) References Cited

U.S. PATENT DOCUMENTS

| | | | |
|---|---|---|---|
| 5,576,872 A | | 11/1996 | Kitajima et al. |
| 6,134,031 A | * | 10/2000 | Nishi et al. ............... 359/15 |
| 6,185,021 B1 | * | 2/2001 | Fatehi et al. ............... 398/9 |
| 6,445,841 B1 | | 9/2002 | Gloeckner et al. |
| 6,456,752 B1 | * | 9/2002 | Dragone ............... 385/17 |
| 6,801,679 B2 | | 10/2004 | Koh et al. |

(Continued)

FOREIGN PATENT DOCUMENTS

WO    WO-2011078844 A1    6/2011

OTHER PUBLICATIONS

PCT International Search Report & Written Opinion, Dec. 6, 2012, PCT Patent Application No. PCT/US2012/033120, 9 pages.

*Primary Examiner* — Danny Leung
(74) *Attorney, Agent, or Firm* — Hanley Flight & Zimmerman, LLC (57) ABSTRACT

Systems, methods, and apparatus to route optical signals are disclosed. An example apparatus to route optical signals includes a plurality of hollow metal waveguide optical switch arrays. Each of the arrays comprises a plurality of optical input ports and a plurality of optical output ports. The input ports and the output ports for a first one of the arrays are arranged in a first plane, the input ports and the output ports for a second one of the arrays are arranged in a second plane, and the plurality of arrays are stacked such that the first and second planes are adjacent. The first one of the arrays is to convey optical signals from a first communication device to a second communication device and the second one of the arrays is to convey optical signals from the second communication device to the first communication device.

15 Claims, 5 Drawing Sheets

(56) References Cited

U.S. PATENT DOCUMENTS

| | | |
|---|---|---|
| 7,162,632 B2 * | 1/2007 | Cao et al. .................... 713/163 |
| 8,045,854 B2 | 10/2011 | Colbourne |
| 2002/0034354 A1 | 3/2002 | Hayashi et al. |
| 2002/0071627 A1 * | 6/2002 | Smith et al. .................... 385/15 |
| 2002/0168131 A1 * | 11/2002 | Walter et al. .................... 385/16 |
| 2002/0181067 A1 * | 12/2002 | Romanovsky et al. ....... 359/245 |
| 2002/0181846 A1 * | 12/2002 | Hoen .............................. 385/18 |
| 2003/0016904 A1 * | 1/2003 | Tajima et al. ................... 385/16 |
| 2003/0053740 A1 * | 3/2003 | Wu .................................. 385/17 |
| 2003/0185494 A1 * | 10/2003 | Sugiyama et al. .............. 385/17 |
| 2004/0027644 A1 * | 2/2004 | Fazi, Jr. ......................... 359/298 |
| 2004/0042732 A1 * | 3/2004 | Bruns ............................. 385/71 |
| 2004/0086218 A1 | 5/2004 | Liu et al. |
| 2005/0069314 A1 * | 3/2005 | De Patre et al. .................. 398/5 |
| 2005/0220413 A1 * | 10/2005 | Stevens et al. .................. 385/47 |
| 2009/0052837 A1 * | 2/2009 | Safrani et al. ................... 385/16 |
| 2011/0274391 A1 | 11/2011 | Tan et al. |

* cited by examiner

(Prior Art)

ROUTING OPTICAL SIGNALS

BACKGROUND

Telecommunication and data networks are increasingly being implemented using optical fiber links. Traditionally, the optical signals carried by the fibers were converted to electrical signals and any signal routing functions performed in the electrical domain.

DETAILED DESCRIPTION

Example systems, methods, and apparatus to route optical signals are disclosed herein. Example systems, methods, and apparatus disclosed herein provide more efficient optical switching by reducing optical losses and enabling the use of lower-cost components for optical computing applications. In some examples, the optical switches are used in data centers to connect processing units. In some multi-layer hollow metal waveguide (HMWG) optical switches disclosed herein, each layer (or array) of an optical switch includes a set of input ports on a first side of the layer and a set of output ports on a second side of the layer. The layer is configured in a grid, where the grid may be configured using microelectromechanical systems (MEMS) such as MEMS reflectors to direct optical signals received on any of the input ports to any one of the output ports. The MEMS reflectors selectively change optical pathways between the input ports and the output ports (e.g., in response to an electrical control signal). In some disclosed examples, the number of input ports is different than the number of output ports (e.g., the input ports are a multiple of the output ports, the output ports are a multiple of the input ports, etc.). Some examples described herein convey optical signals between two processing devices in both directions using multiple layers or arrays.

In some disclosed examples, an optical switch includes multiple layers of switches to create an optical connection (or link) having multiple channels from a first processing unit to a second processing unit. For example, the optical switch may have four similar or identical layers to route a four-channel connection between processing devices and to selectively change routing between processing devices.

An example apparatus to route optical signals includes a plurality of HMWG optical switch arrays. Each of the arrays includes a first number of optical input ports and a second number of optical output ports different than the first number of input ports. The input ports and the output ports for a first one of the arrays are arranged in a first plane, and the input ports and the output ports for a second one of the arrays are arranged in a second plane. The arrays are stacked such that the first and second planes are parallel. The first array conveys optical signals from a first communication device to a second communication device and the second array conveys optical signals from the second communication device to the first communication device, wherein the output ports of the first array are adjacent the input ports of the second array.

An example method includes applying a signal to a plurality of HMWG optical switch arrays. Each of the arrays in the method includes a first number of optical input ports and a second number of optical output ports (different than the first number of input ports). The input ports and the output ports for a first one of the arrays in the method is arranged in a first plane, and the input ports and the output ports for a second one of the arrays are arranged in a second plane. The first and second arrays include MEMS reflectors to selectively couple combinations of the optical input ports and the optical output ports. A first one of the arrays conveys signals from a first communication device to a second communication device and the second one of the arrays conveys optical signals from the second communication device to the first communication device. The applied signal causes corresponding ones of the MEMS reflectors in the first and second arrays to optically couple corresponding input ports of the first and second arrays to corresponding output ports of the first and second arrays.

While terms such as source and destination are used herein, these words are for ease of reference only. These terms are not intended, and are not to be construed, to impose directional requirements or purposes on systems, methods, apparatus, communications, or any other aspect of the disclosure or the claims of this disclosure, unless specifically provided otherwise. As used herein, an input port refers to a communications port through which a signal is received from an external device. As used herein, an output port refers to a communications port from which a signal is transmitted to an external device.

Some examples are described below using the terms vertical and/or horizontal. The terms vertical and/or horizontal do not necessarily refer to absolute directions, but instead are relative terms referenced to other structures in the example.

Figure 1:
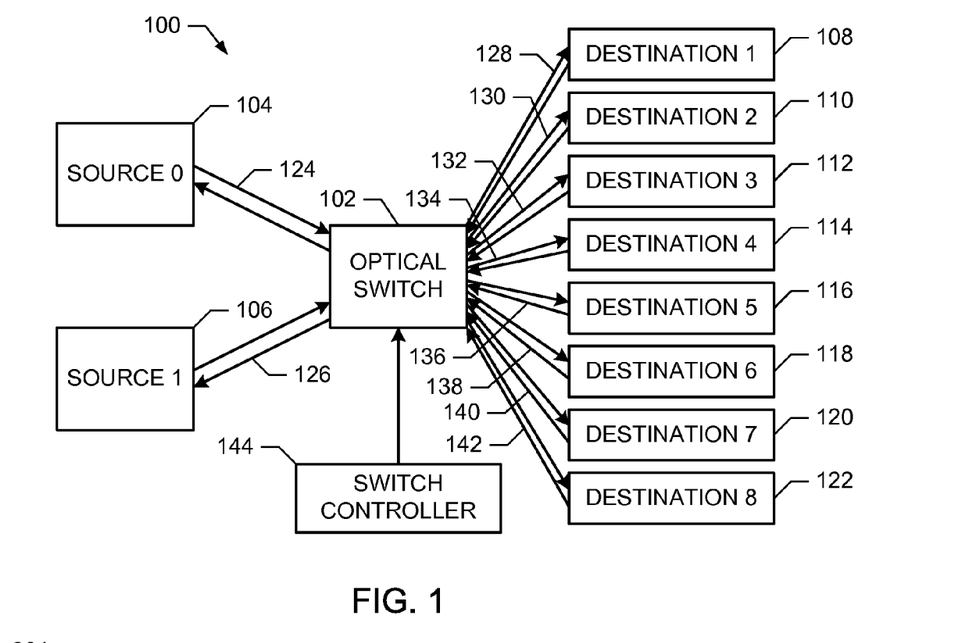
FIG. 1 is a block diagram of an example system including an optical switch coupling an uneven number of sources and destinations in accordance with the teachings of this disclosure.

FIG. 1 is a block diagram of an example system 100 including an optical switch 102 optically coupling an uneven number of sources and destinations. The example system 100 of FIG. 1 may be used, for example, to provide selectable interconnections between different processing units.

The example system of FIG. 1 includes multiple sources 104, 106 and multiple destinations 108, 110, 112, 114, 116, 118, 120, 122. Any or all of the sources and/or destinations may be processing units, storage devices, or any other form of electrical and/or optical circuitry. In the illustrated example, the example optical switch 102 optically couples each of the sources 104, 106 to a single one of the destinations 108-122. Therefore, the example optical switch 102 of FIG. 1 optically couples the sources 104, 106 to respective ones of the destinations 108-122. The selection may be based, for example, on resource needs in a data processing center or on the availability of primary and/or secondary processing units. Conversely, in examples in which there are more sources than destinations, the example optical switch 102 may optically couple multiple ones of the sources to a single one of the destinations.

The example sources and destinations 104-122 are coupled to the optical switch via respective optical links 124-142. In some examples, some or all of the optical links 124-142 are multiple-channel links (e.g., multiple channels of optical signals may be simultaneously transmitted between a source and a destination via the same link) and/or multiple-direction links (e.g., optical signals may be transmitted from source to destination and from destination to source). In particular, the links 124-142 may be multiple-fiber links where at least one of the fibers conveys optical signals from a destination device 108-122 to a source device 104, 106, and at least one of the fibers conveys optical signals from the source device 104, 106 to the destination device 108-122.

To provide efficient routing between the sources 104, 106 and the destinations 108-122, the example optical switch 102 of FIG. 1 is an asymmetric optical switch in that the optical switch 102 has a different number of inputs ports than output ports. For example, the optical switch 102 of FIG. 1 may have four times more ports (e.g., input and/or output ports) coupling the optical switch 102 to the destination(s) 108-122 than ports (e.g., input and/or output ports) coupling the optical switch 102 to the source(s).

The example optical switch 102 of FIG. 1 routes signals between respective ones of the sources 104, 106 and respective ones of the destinations 108-122. A switch controller 144 controls the optical switch 102 to select the routing paths. The routing paths are defined in the illustrated example by intersecting HMWG paths that may be selectively coupled. For example, the switch controller 144 provides one or more electrical signals to the optical switch 102 to cause the optical switch 102 to configure and/or reconfigure one or more MEMS reflectors (e.g., optical mirrors) within the optical switch 102. A change in the configuration of the MEMS reflectors in the optical switch 102 causes the optical switch 102 to reconfigure the optical pathways of the switch 102 to route optical signals between different ones of the sources 104, 106 and the destinations 108-122.

The example switch controller 144 controls MEMS reflectors in multiple layers of the example switch 102 to simultaneously optically couple and/or optically decouple corresponding input ports to corresponding output ports. To control the MEMS reflectors, the example switch controller 144 is electrically coupled to the MEMS reflectors to provide the signal. The electrical coupling may include independently coupling the switch controller 144 to each layer of the switch 102 and/or coupling the switch controller 144 to a bus coupled to all layers of the switch 102. In some examples, the switch controller 144 is electrically coupled to a first layer of the switch 102, and the layers of the switch 102 are electrically coupled to other layers such that corresponding MEMS reflectors (e.g., vertically displaced MEMS reflectors) in each layer are controlled simultaneously by a signal.

Figure 2:
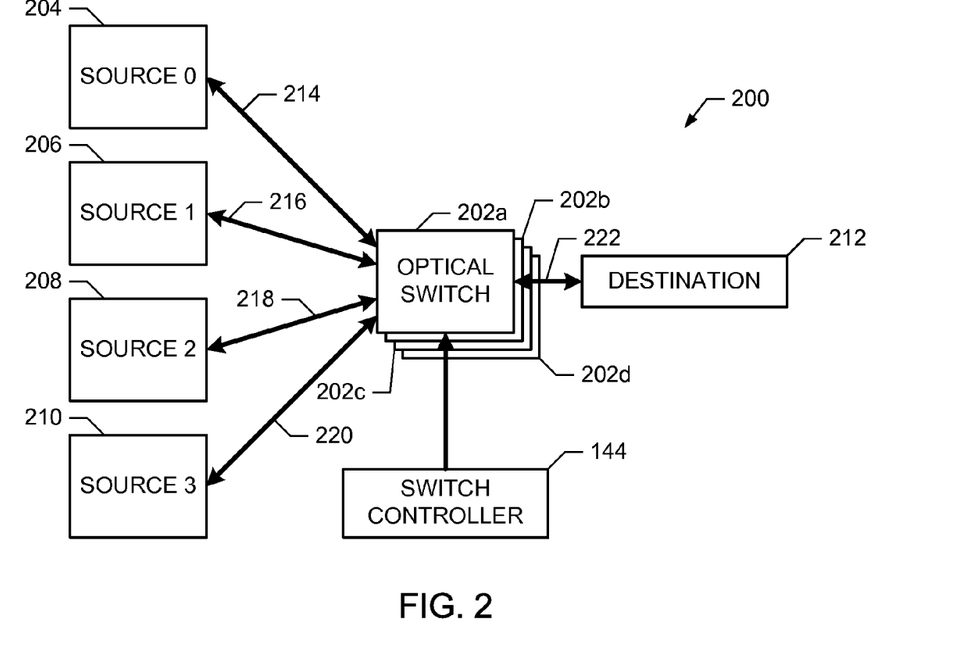
FIG. 2 is a block diagram of another example system including an optical switch coupling an uneven number of sources and destinations in accordance with the teachings of this disclosure.

FIG. 2 is a block diagram of another example system 200 including an optical switch 202 optically coupling an uneven number of sources and destinations. The example system 200 of FIG. 2 includes four sources 204, 206, 208, 210 that may be selectively optically coupled to a same destination 212.

The example sources 204-210 and the example destination 212 are connected to the optical switch 202 via respective multiple-channel links 214, 216, 218, 220, 222. In the example of FIG. 2, the multiple-channel links 214-222 are four-channel links. A channel may be defined via a discrete optical fiber. Furthermore, an optical fiber may carry or propagate signals in both directions along the length of the fiber. Thus, a four-channel unidirectional link would include 4 optical fibers (e.g., 2 fibers transmitting in either direction). To switch the four-channel links 214-222, the example optical switch 202 of FIG. 2 includes four stacked layers 202a, 202b, 202c, 202d. The example layers 202a-202d of FIG. 2 are substantially identical and are arranged such that the ports of the respective layers 202a-202d are aligned. Each of the layers 202a-202d is optically coupled to a corresponding one of the channels for each of the links 214-222. Each layer 202a-202d is optically coupled to the corresponding one of the channels for each of the links 214-222 (e.g., the first layer 202a is coupled to the first channel for the link 214, the second layer 202b is coupled to the second channel for the link 214, etc.). Thus, the use of multiple layers 202a-202d enables the use of fewer ports for each layer 202a-202d than if a single-layered symmetric switch were used to switch between the sources 204-210 and the destination 212 (e.g., four ports in four layers as opposed to sixteen ports in one layer), thereby decreasing the optical losses for the links 214-222.

A switch controller 144 (e.g., the switch controller 144 of FIG. 1) controls the optical switch 202 to select the routing paths between the sources 204-210 and the destination 212. In the example of FIG. 2, the switch controller 144 causes the optical switch 202 to change the state(s) of each of the layers 202a-202d at about the same time (e.g., simultaneously). Further, in the illustrated example, all channels in the link 214 for one source (e.g., the source 204) are coupled to the destination 212 (e.g., via all channels in the link 222). In some examples, after the change of state is completed, the previous source (e.g., the source 204) is decoupled from the destination 212, a different source (e.g., the source 206) is coupled to the destination 212, and the remaining sources 208-210 remain decoupled from the destination 212.

While example numbers of sources and destinations are shown and described above, different numbers of sources, different numbers of destinations, and/or different numbers of channels per link may be used.

Figure 3:
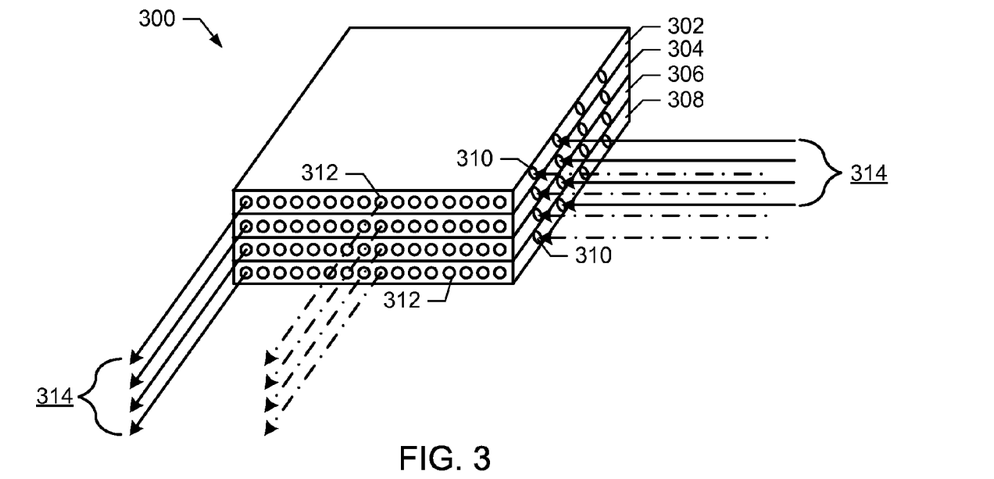
FIG. 3 illustrates an example stacked asymmetric optical switch to implement the example optical switches of FIGS. 1 and 2.

FIG. 3 illustrates an example stacked asymmetric optical switch 300. The example optical switch 300 of FIG. 3 may be used to implement either of the optical switches 102, 202 of FIGS. 1 and/or 2 to selectively couple source(s) and destination(s). In the example of FIG. 3, the number of sources is not equal to the number of destinations. The example optical switch 300 includes 4 layers 302, 304, 306, 308. Each layer 302-308 has a first number of input ports 310 on a first side and a second number of input ports 312 on a second side of the optical switch 300. The second number is not equal to the first number. In the example of FIG. 3, each layer 302-308 includes four input ports 310 and sixteen output ports 312 (e.g., a 4×16 layer or array). Any of the input ports 310 in a given layer 302-308 may be optically coupled to any of the output ports 312 on the same layer 302-308 to transmit signals from a source to a destination. However, only one input port can be coupled to a given output port at a time in the example of FIG. 3.

In the example switch 300 of FIG. 3, the layers 302-308 are controlled to couple corresponding input ports 310 to corresponding output ports 312. For example, the layers 302-308 each receive a respective one of a set of optical signals 314 on a corresponding input port 310 (e.g., a second input port of the four input ports on each layer each receives a signal) and optically couple the respective ones of the received signals to corresponding output ports 312 (e.g., a sixteenth output port of sixteen ports on each layer).

Changes in the optical coupling of the input ports 310 and output ports 312 may be effectuated in a desired time sequence (e.g., simultaneously or substantially simultaneously) for all of the example layers 302-308 by actuating corresponding MEMS reflectors in each of the layers 302-308. The actuation may be performed by applying the same signal to each of the layers 302-308 (e.g., via a bus coupling corresponding connections to the MEMS reflectors in the layers) and/or by providing electrical connections (e.g., inter-layer connections) between corresponding MEMS reflectors in adjacent layers 302-308, thereby automatically electrically coupling adjacent layers when the layers are physically stacked. The electrical connections may be implemented using any type(s) of electrical connector and/or electrical connection method(s).

The example layers may be attached to adjacent layers such that structural support is derived from the attachments. In some examples, multiple discrete layers may be physically (e.g., clamped, clipped) and/or chemically (e.g., glued) fastened together. In some other examples, the layers are constructed and/or connected using integrated circuit packaging techniques such as die stacking. In some examples, the layers are spaced and/or dimensioned to permit a standard multi-fiber optical cable to be optically coupled to respective ports on the different layers.

Figure 4:
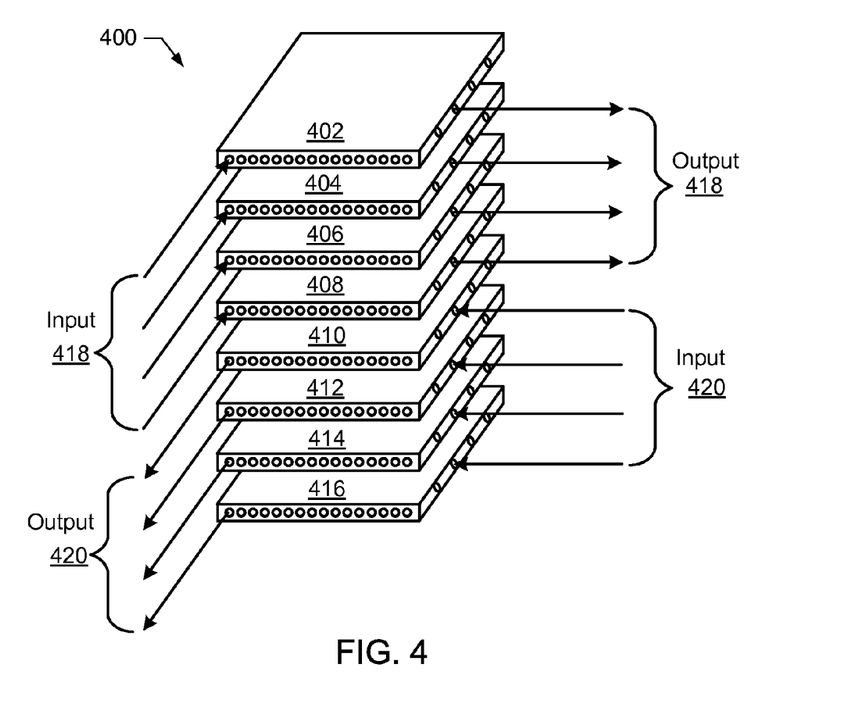
FIG. 4 illustrates another example stacked asymmetric optical switch to implement the example optical switches of FIGS. 1 and 2.

FIG. 4 illustrates another example stacked asymmetric optical switch 400 to implement the example optical switches 102, 202 of FIGS. 1 and/or 2. The example optical switch 400 of FIG. 4 includes eight layers 402-416. Although the switch 300 of FIG. 3 was shown with its layers attached, the layers 402-416 of the example optical switch 400 of FIG. 4 are shown in a partially exploded view for clarity of illustration. In operation, the layers 402-416 of the example optical switch 400 are physically and/or chemically coupled or attached to one another in a manner similar to that shown in FIG. 3.

In the example of FIG. 4, each of the layers 402-416 includes four ports on a first side and sixteen ports on a second side, enabling the example optical switch to optically couple up to four source (or destination) devices to up to sixteen destination (or source) devices. The input ports of the layers 402-408 are on the same side of the switch 400 (and the same side of the layers 402-416) as the output ports of the layers 410-416 (e.g., the input ports of the layers 402-408 are vertically aligned with and/or adjacent the output ports of the layers 410-416). Similarly, the input ports of the layers 410-416 are on the same side of the switch 400 as the output ports of the layers 402-408. (e.g., the input ports of the layers 410-416 are vertically aligned with and/or adjacent the output ports of the layers 402-408).

In the example of FIG. 4, the switch 400 is configured to route eight-channel bi-directional traffic using eight unidirectional channels (e.g., four channels in a first direction, four channels in the opposite direction) between the respective source(s) and destination(s). The example layers 402-408 direct first optical signals 418 in a first direction between first corresponding (e.g., vertically aligned) input ports (e.g., one in each layer 402-408) and first corresponding (e.g., vertically aligned) output ports, and the example layers 410-416 direct second optical signals 420 in a second direction between second corresponding (e.g., vertically aligned) input ports and second corresponding (e.g., vertically aligned) output ports.

Both sets of optical signals 418, 420 are routed between the same devices via the same switching event (e.g., simultaneously). Further, each layer 402-416 has a corresponding MEMS reflector that is switched simultaneously with MEMS reflectors in the other layers 402-416 to thereby simultaneously optically couple the corresponding ports (which in the example of FIG. 4 are vertically aligned relative to one another) for all layers 402-416 with their respective ports. The optical signals 418, 420 are optically coupled to corresponding ports on all of the layers 402-416.

While known single-layer and/or symmetric optical switches may be configured to provide bi-directional traffic, as explained below these known optical switches are more expensive to implement due to the use of bidirectional transceivers and/or suffer from increased optical losses compared to the example switch 400 of FIG. 4 due to the use of single-layered symmetric switches.

Figure 5A:
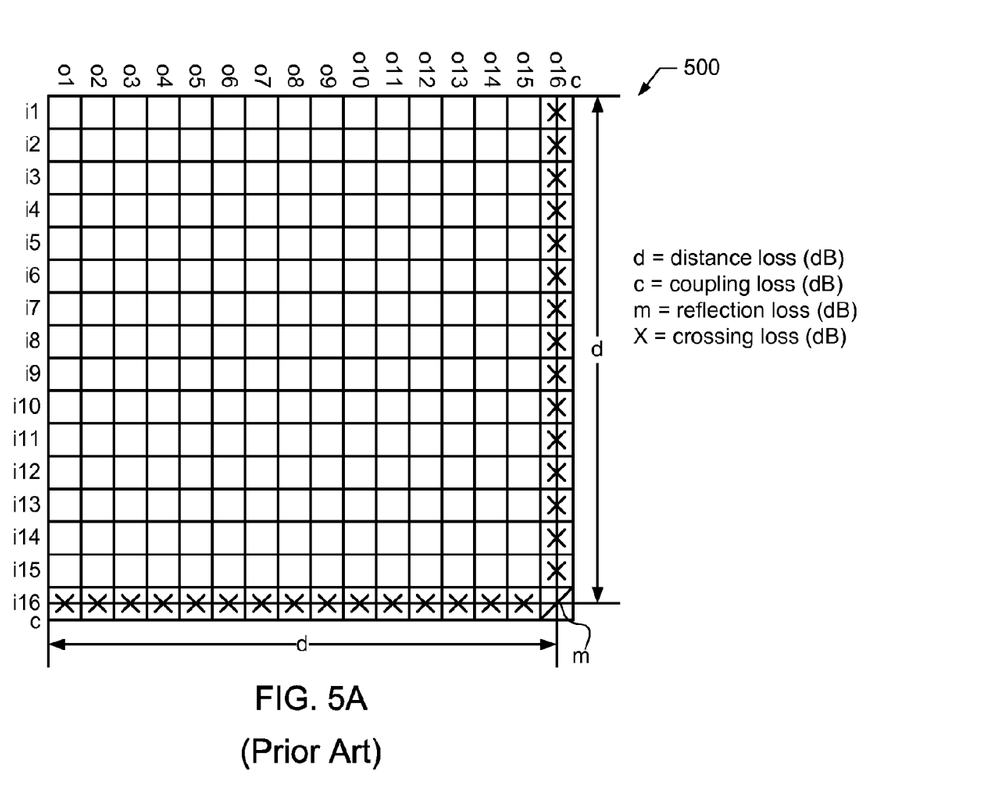
FIG. 5A illustrates a known symmetric switch.

FIG. 5A illustrates a known symmetric switch 500. The symmetric switch 500 includes sixteen input ports (i1-i16) and sixteen output ports (o1-o16). Optical signals enter the switch 500 (e.g., from an optical fiber) coupled to an input port i1-i16. An optical signal input to the switch on an input port i1-i16 is routed to one of the output ports o1-o16, where the optical signal exits the switch (e.g., to an optical fiber). Any of the input ports i1-i16 may be coupled to any of the output ports o1-o16 via a respective MEMS reflector (e.g., a retractable mirror). Thus, the switch 500 includes 256 MEMS reflectors (i.e., $16^2$) to couple any combination of input ports and output ports.

Figure 5B:
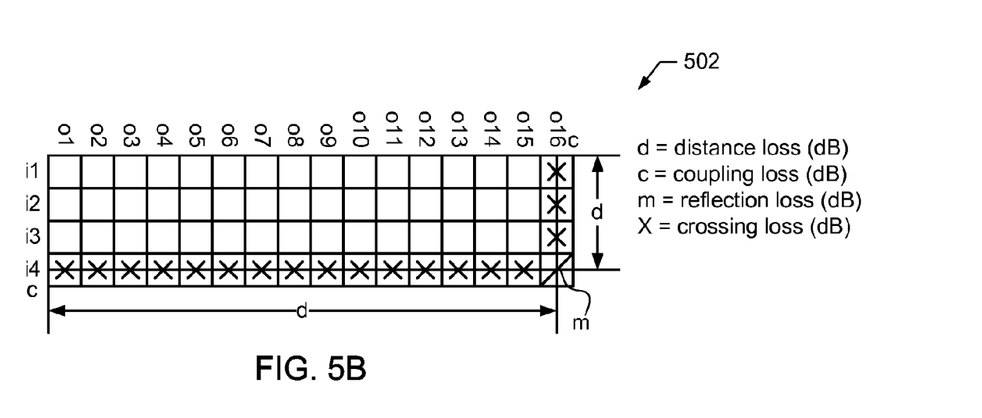
FIG. 5B illustrates a layer of an example asymmetric optical switch.

Optical losses occur in the switch 500 from four primary sources: distance (or propagation) loss (represented by d in FIGS. 5A and 5B), coupling loss (e.g., losses due to the interface between the optical fiber and the switch medium, represented by c in FIGS. 5A and 5B), reflection loss (e.g., losses caused by the reflection from the MEMS reflector(s), represented by m in FIGS. 5A and 5B), and crossing losses (e.g., losses from gaps in the hollow metal waveguide path at each potential output path, represented by X in FIGS. 5A and 5B). The coupling losses and reflection losses are substantially constant between any input port and output port. However, the upper limit on distance losses and crossing losses are based on the size of the switch 500 (e.g., the number of ports).

In the 16-port by 16-port switch 500, combined optical signal losses between an input port and an output port may be, for instance, as high as 5.42 dB (e.g., for the illustrated connection between i16 and o16 in FIG. 5A). In a 32-port by 32-port switch 500, combined optical signal losses may be, for instance, as high as 8.92 dB. In a 64-port by 64-port switch 500, combined optical signal losses may be, for instance, as high as 15.92 dB, and higher numbers of ports yield progressively higher losses for switches having the same general characteristics. In general, optical signal losses greater than 6 dB cause substantial challenges to computer optical applications. Optical signal losses greater than 10 dB may render the optical switch useless for many or most optical computer applications. Thus, the type of switch illustrated in FIG. 5A has significant limitations on usefulness for many computer applications.

FIG. 5B illustrates a layer 502 of an example asymmetric optical switch constructed in accordance with the teachings of this disclosure. The example layer 502 may be used to implement any of the layers 202a-202d, 302-308, 402-416 of FIGS. 2-4. The layer 502 includes four input ports i1-i4 and sixteen output ports o1-o16. The layer 502 may be used in combination with additional layers to provide selectable multi-channel optical connections (e.g., optical pathways) between source(s) and destination(s) and/or may be used to provide selectable single-channel optical connections between source(s) and destination(s).

When using the example switches 102, 202, 300, 400 to provide multiple-channel connections, the number of stacked layers in the switch are equal or less than the number of channels per connection. For example, if a protocol is based upon using a group of four channels to provide one connection (N ports×4 ports, or 4 ports×N ports, where N≠4), then the switch 102, 202, 300, 400 can include up to four layers, and the switch will operate in modulo 4 mode, namely, all four lanes can be switched, and follow the same route on each layer.

Using the topology of FIG. 5B above as an example, assume two links (from two different sources), with four ports or channels each, are coupled to the input ports of a switch. Further, the switch includes thirty-two output ports, optically coupled to eight links (going to eight different destinations) each having four channels. Thus, the example configuration has two sources being switched between eight destinations. Using a single-layer symmetrical chip solution as shown in FIG. 5A, a 32×32 chip would be necessary to provide the potential couplings. As discussed above, a 32×32 switch has associated optical losses of up to 8.92 dB. This level of optical power loss is at the high end of what low-cost, short channel photonic links could tolerate. In contrast, a four-layer optical switch may be used by stacking four layers according to the example solution of FIG. 5B, each layer having two input ports and eight output ports. This solution would incur an upper optical power loss of 3.96 dB, which is a substantial improvement over the single layer implementation.

In another example, a system uses sixteen inputs, comprising four input links of four channels each, and sixty-four outputs, comprising sixteen output links having four channels each. In this example, a single-planar symmetrical array implementation using the solution of FIG. 5A would need to be a 64×64 switch, with associated optical losses of up to 15.92 dB. This high level of optical loss would likely require more expensive optical transmitters and/or receivers, which would substantially increase the cost of this solution. In contrast, a stacked asymmetric array including four layers, each having an asymmetric array of four input ports and sixteen output ports, could be used. In such an example, the four stacked switch layers may be configured to switch the same way at the same time. Since each four-port by sixteen-port layer would only incur 3.96 dB of optical losses and the solution is parallel, the upper loss would not exceed 3.96 dB, which is a substantial improvement over the known solution illustrated in FIG. 5A. Further, this lower optical loss enables the effective use of lower-cost optical components without sacrificing reliability of signaling.

The example switch controller 144 of FIGS. 1 and 2 may be implemented by hardware, software, firmware and/or any combination of hardware, software and/or firmware. Thus, for example, the switch controller 144 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, the example switch controller 144 is hereby expressly defined to include a tangible computer readable storage medium such as a memory, DVD, CD, Blu-ray, etc. storing the software and/or firmware.

Figure 6:
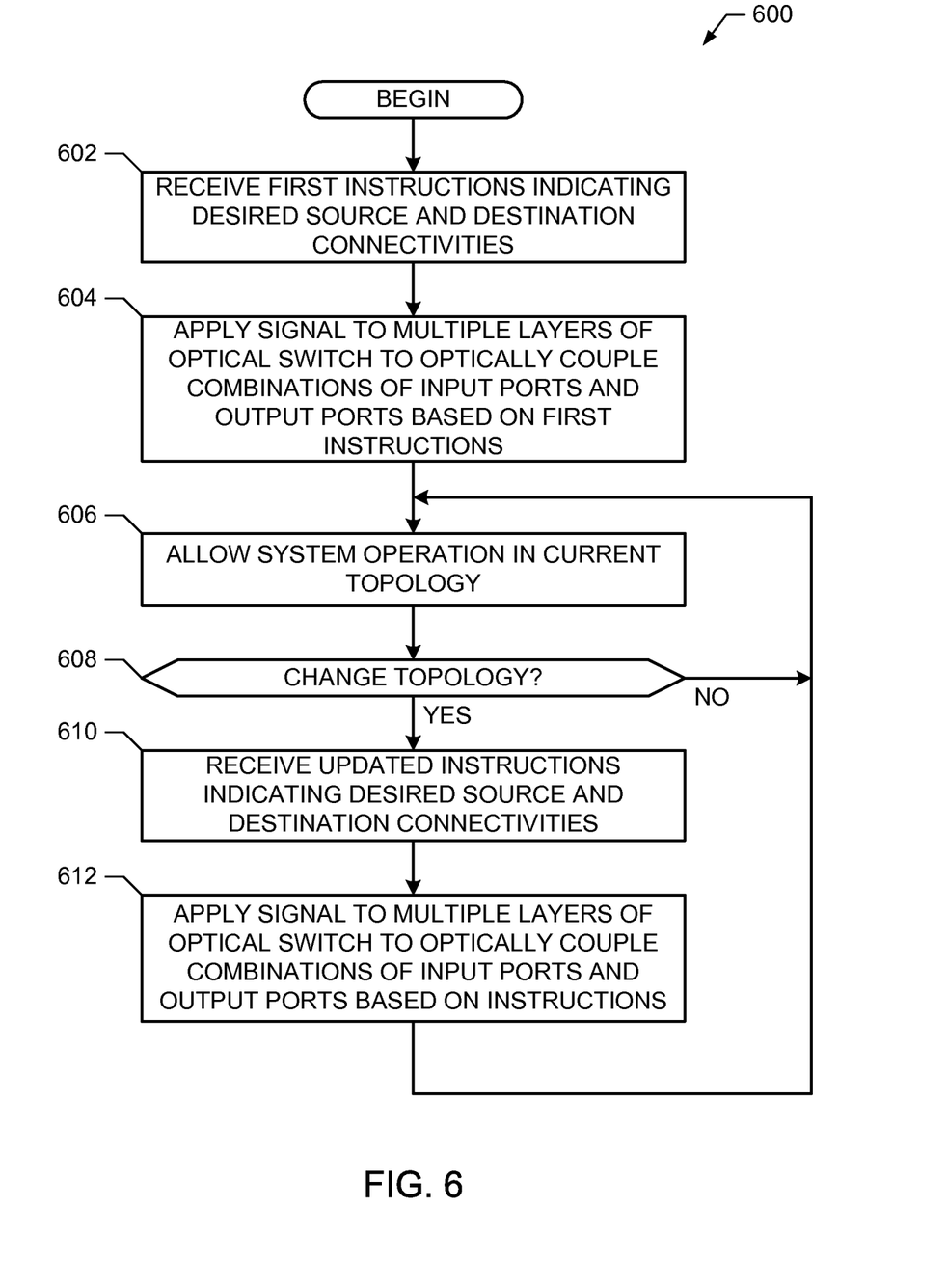
FIG. 6 is a flowchart representative of example machine readable instructions which may be executed to implement a switch controller.

A flowchart representative of example machine readable instructions for implementing the switch controller 144 of FIGS. 1 and 2 is shown in FIG. 6. In this example, the machine readable instructions comprise a program for execution by a processor such as the processor 712 shown in the example computer 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example switch controller 144 may alternatively be used. For example, the order of execution of the blocks may be changed, and/or some of the blocks described may be changed, eliminated, or combined.

As mentioned above, the example process of FIG. 6 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIG. 6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 6 is a flowchart representative of example machine readable instructions 600 which may be executed to implement a switch controller (e.g., the switch controller 144 of FIGS. 1 and 2). The example switch controller 144 may perform the instructions 600 to control a multi-layer optical switch (e.g., a plurality of hollow metal waveguide optical switch arrays), where each of the layers (arrays) includes a first number of optical input ports and a second number of optical output ports. Each of the layers of the example multi-layer optical switch includes a set of MEMS reflectors to selectively couple combinations of the optical input ports and the optical output ports.

The example switch controller 144 receives first instructions indicating desired source and destination connectivities (block 602). For example, the switch controller 144 may receive instructions indicating which of a plurality of sources are to be coupled to ones of a plurality of destinations.

Based on the received instructions, the example switch controller 144 applies a signal to the layers of the optical switch to cause corresponding ones of the MEMS reflectors in the layers to optically couple corresponding input ports of the layers to corresponding output ports of the layers (block 604). For example, the switch controller 144 may apply a signal to a bus coupled to corresponding MEMS reflectors in the multiple layers to cause the MEMS reflectors to actuate, coupling corresponding input ports on the layers (e.g., input ports in similar or identical positions on different layers, such as the first input port on each layer, the fourth input port on each layer, etc.) to corresponding output ports on the layers (e.g., output ports in similar or identical positions on the different layers, such as the first output port on each layer, the fourth output port on each layer, etc.).

The example switch controller 144 allows operation of the system in the topology (block 606). The example switch controller 144 determines (e.g., periodically, aperiodically, at particular times, in response to a trigger event, or on request) whether to change the topology (block 608). The example determination of block 608 may be performed in response to, for example, a failover condition where a processing device becomes unavailable. In some other examples, the instructions 600 may be performed based on a manual selection and/or occurrence of an event (e.g., a redistribution of computing resources). Any other triggering event(s) and/or condition(s) may be used. If the switch controller 144 is not to change the topology (block 608), control returns to block 606 to continue allowing system operation in the current topology.

When the topology is to be changed (block 608), the switch controller 144 receives updated instructions indicating desired source-destination connectivities (block 610). Based on the instructions, the example switch controller 144 applies signal(s) to the multiple layers of the optical switch to optically couple combinations of input ports and output ports based on the received instructions (block 612). In the example instructions of FIG. 6, control returns to block 606 to allow system operation in the updated topology.

Blocks 606-612 may iterate during the operating of the system to update the optical switch and/or system topologies as desired. The example instructions may end when, for example, the system is shut down or in response to one or more conditions or events.

Figure 7:
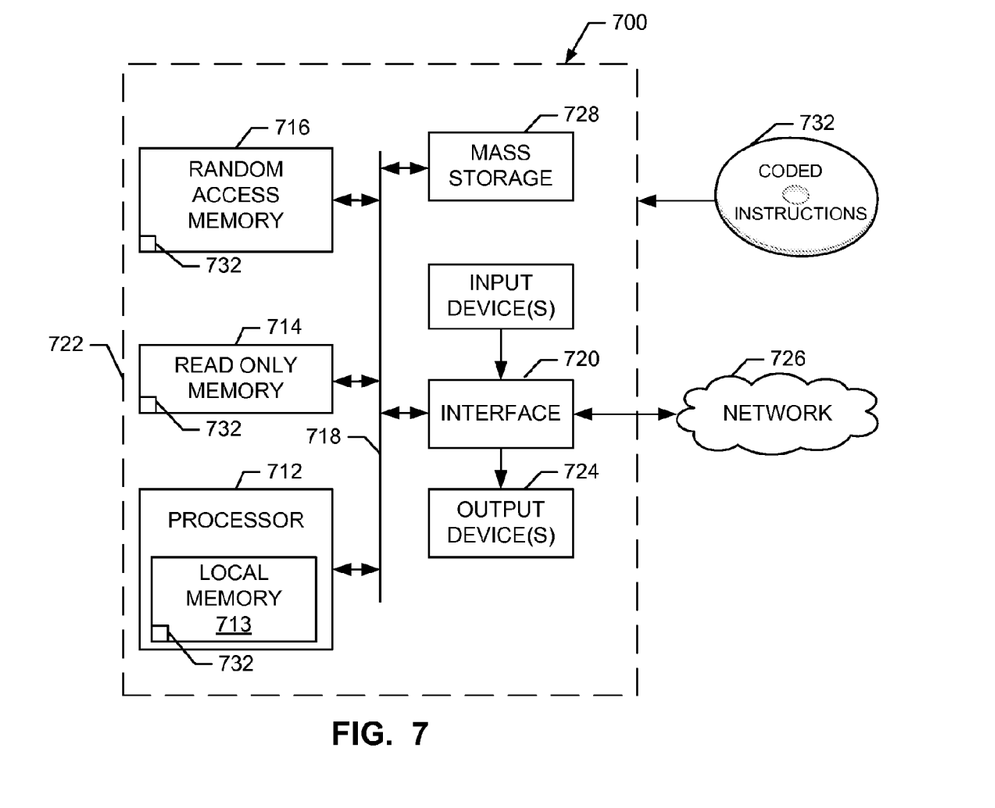
FIG. 7 is a block diagram of an example computer capable of executing the instructions of FIG. 6 to implement the switch controller of FIGS. 1 and/or 2.

FIG. 7 is a block diagram of an example computer 700 capable of executing the instructions of FIG. 6 to implement the switch controller 144 of FIGS. 1 and 2. The computer 700 can be, for example, a server, a personal computer, a routing device, an Internet backbone device, or any other type of computing device.

The system 700 of the instant example includes a processor 712. For example, the processor 712 can be implemented by one or more microprocessors or controllers from any desired family or manufacturer.

The processor 712 includes a local memory 713 (e.g., a cache) and is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The computer 700 also includes an interface circuit 720. The interface circuit 720 may be implemented by any type of interface standard, such as an Ethernet interface, a universal serial bus (USB), and/or a PCI express interface.

One or more input devices 722 are connected to the interface circuit 720. The input device(s) 722 permit a user to enter data and commands into the processor 712. The input device(s) can be implemented by, for example, a keyboard, a mouse, a touchscreen, a track-pad, a trackball, isopoint and/or a voice recognition system.

One or more output devices 724 are also connected to the interface circuit 720. The output devices 724 can be implemented, for example, by display devices (e.g., a liquid crystal display, a cathode ray tube display (CRT), a printer and/or speakers). The interface circuit 720, thus, typically includes a graphics driver card.

The interface circuit 720 also includes a communication device such as a modem or network interface card to facilitate exchange of data with external computers via a network 726 (e.g., an Ethernet connection, a digital subscriber line (DSL), a telephone line, coaxial cable, a cellular telephone system, etc.).

The computer 700 also includes one or more mass storage devices 728 for storing software and data. Examples of such mass storage devices 728 include hard drive disks, solid state storage, compact disk drives and digital versatile disk (DVD) drives.

The coded instructions 732 of FIG. 6 may be stored in the mass storage device 728, in the volatile memory 714, in the non-volatile memory 716, and/or on a removable storage medium such as a CD or DVD.

Example systems, methods, and apparatus have been disclosed to provide more efficient routing of optical signals between multiple sources and/or destinations. In particular, systems, methods, and apparatus disclosed utilize optical switch arrays having a number of inputs different from a number of outputs is different to provide reduced optical losses for applications in which the numbers of source(s) and destination(s) are not equal. Additionally, example systems, methods, and apparatus disclosed herein enable the use of less expensive optical transmitters and receivers than known switches having higher optical losses.

Although certain methods, apparatus, and articles of manufacture have been described herein, the scope of coverage of this patent is not limited thereto. To the contrary, this patent covers all methods, apparatus, and articles of manufacture falling within the scope of the claims.

What is claimed is:

1. An apparatus to route optical signals, comprising:
    a plurality of hollow metal waveguide optical switch arrays, each of the arrays comprising:
        a plurality of optical input ports; and
        a plurality of optical output ports, the input ports and the output ports for a first one of the arrays being arranged in a first plane, the input ports and the output ports for a second one of the arrays being arranged in a second plane, and the plurality of arrays being stacked such that the first and second planes are adjacent, the first one of the arrays to convey optical signals from a first communication device to a second communication device and the second one of the arrays to convey optical signals from the second communication device to the first communication device.

2. An apparatus as defined in claim 1, wherein each of the plurality of arrays includes a plurality of microelectromechanical reflectors to selectively couple pairs of the input ports and the output ports of the respective array.

3. An apparatus as defined in claim 2, wherein a first one of the pluralities of the microelectromechanical reflectors for the first array and a second one of the matrices of the microelectromechanical reflectors for the second array are to couple corresponding input ports for the first and second arrays to corresponding output ports of the first and second arrays, respectively.

4. An apparatus as defined in claim 3, wherein the first plurality of microelectromechanical systems for the first array and the second plurality of microelectromechanical systems for the second array are configured to simultaneously couple the corresponding input ports for the first and second arrays to the corresponding output ports of the first and second arrays.

5. An apparatus as defined in claim 1, further comprising a switch controller to control a plurality of microelectromechanical reflectors in the first and second arrays to selectively change optical pathways between the input and output ports of the first and second arrays.

6. An apparatus as defined in claim 1, wherein a first microelectromechanical reflector in the first array is to cooperate with a second microelectromechanical reflector in the second array, such that the first and second microelectromechanical reflectors optically couple corresponding input ports on the first and second arrays to corresponding output ports on the first and second arrays, respectively.

7. An apparatus as defined in claim 6, wherein the corresponding input ports of the first and second arrays are adjacent, the corresponding output ports of the first and second arrays are adjacent, and the corresponding microelectromechanical reflectors of the first and second arrays are adjacent.

8. A method to route optical signals, comprising:
applying at least one signal to a plurality of hollow metal waveguide optical switch arrays, each of the arrays comprising a plurality of optical input ports and a plurality of optical output ports, the input ports and the output ports for a first one of the arrays being arranged on a first plane, the input ports and the output ports for a second one of the arrays being arranged on a second plane, and the arrays being stacked such that the first and second planes are adjacent, wherein the first one of the arrays is to convey optical signals from a first communication device to a second communication device and the second one of the arrays is to convey optical signals from the second communication device to the first communication device, wherein the output ports of the first array are adjacent the input ports of the second array; and
responding to the at least one signal by adjusting microelectromechanical reflectors in the first and second arrays to form optical pathways between the input ports and the output ports, such that corresponding input ports of the first and second arrays are in optical communication with corresponding output ports of the first and second arrays.

9. A method as defined in claim 8, wherein responding to the at least one signal further comprises simultaneously adjusting the microelectromechanical reflectors to form the optical pathways.

10. A method as defined in claim 8, wherein applying the at least one signal comprises applying a first signal to the first array and applying a second signal to the second array, the first and second signals to cause the first and second arrays to cause corresponding ones of the microelectromechanical reflectors in the first and second arrays to form the pathways.

11. A system to route optical signals, comprising:
a first plurality of source devices;
a second plurality of destination devices, the number of source devices in the first plurality being different than the number of destination devices in the second plurality; and
an optical switch having a plurality of layers, wherein a first one of the layers is to convey optical signals from a first one of the source devices to a second one of the destination devices and a second one of the layers is to convey optical signals from the second one of the destination devices to the first one of the source devices.

12. A system as defined in claim 11, wherein the optical switch is to selectively couple ones of the first plurality of source devices to respective ones of the second plurality of destination devices by simultaneously coupling corresponding ports on a first side of the plurality of layers to corresponding ports on a second side of the plurality of layers.

13. A system as defined in claim 11, further comprising a switch controller to actuate microelectromechanical mirrors in the layers to selectively couple ones of the input ports to the ones of the output ports.

14. A system as defined in claim 13, wherein the switch controller is in circuit with corresponding ones of the microelectromechanical mirrors on different ones of the layers via a bus connection.

15. A system as defined in claim 13, wherein the switch controller is coupled to corresponding ones of the microelectromechanical mirrors of the plurality of layers via an interlayer connection.

\* \* \* \* \*